March 2, 1971 — P. HUBLER ET AL — 3,567,579
NUCLEAR REACTOR INSTALLATION
Filed April 15, 1968 — 8 Sheets-Sheet 1

United States Patent Office 3,567,579
Patented Mar. 2, 1971

3,567,579
NUCLEAR REACTOR INSTALLATION
Peter Hubler and Roy K. Nakagawa, Toronto, Ontario,
Canada, assignors to Atomic Energy of Canada Limited,
Ottawa, Ontario, Canada
Filed Apr. 15, 1968, Ser. No. 721,358
Int. Cl. G21c *19/24*
U.S. Cl. 176—30                                    8 Claims

ABSTRACT OF THE DISCLOSURE

Each fuel aggregate used for fueling the reactor is locked and sealed within tis respective fuel channel by means of an end plug portion. For unlocking this portion, releasing the seal and displacing the fuel aggregate out of the channel, a mechanism is used which includes a casing for engaging the channel and two coaxial tubes for engaging the end plug portion. The two tubes are moved together along their longitudinal axis, relatively to the casing, and independently of this motion, the inner one of these tubes is moved along the same axis relatively to the outer tube. The end plug portion similarly comprises two coaxial tubular members, the outer one of which is provided with a set of captive balls and the inner one of which has a surface portion arranged to force these captive balls into a locking groove provided in the inner surface of the channel. The outer and inner tubes of the ram mechanism are similarly provided with a set of captive balls to lock the tubes to the outer and inner tubular members of the end plug portion respectively. The inner tube furthermore serves to displace the inner tubular member relatively to the outer tubular member to engage or disengage the captive balls of the end plug portion to or from the channel groove. The outer tube furthermore serves to actuate means for releasing the seal of the end plug portion.

Reference is made to copending U.S. application Ser. Nos. 721,293, 721,294, 721,295, 721,408, 721,409, and 721,410, filed Apr. 15, 1968.

The present invention relates to a nuclear reactor installation comprising a reactor, preferably of the heavy water type, and a fueling machine for loading and unloading elongated fuel aggregates into and from fuel channels of the reactor.

In U.S. Hummel Pat. No. 157,579 issued Nov. 17, 1964, a fueling machine is disclosed having a ram mechanism for unlocking the plug portion of a fuel aggregate disposed in a fuel channel, releasing its seal and extracting the plug from the channel. This mechanism requires a casing for engaging the respective selected channel and six coaxial tubes which serve to drive four coaxial members independently from and relative to each other along their common longitudinal axis. The two outer ones of these members are driven by two ball drive units, while the two inner ones are driven hydraulically.

A number of difficulties is attached to this construction. The numerous parts required slidingly engage each other and necessitate close tolerances in manufacture. Assembly and maintenance are complex to perform.

According to the present invention, the above mentioned difficulties are overcome by a nuclear reactor installation, comprising a reactor and a fueling machine for loading and unloading elongated fuel aggregates into and from channels of said reactor, an end plug portion of a said fuel aggregate comprising (a) an outer cylindrical member including
   (i) locking means for locking said end plug portion in a selected said channel, and
   (ii) a first inwardly facing cylindrical surface having first recess means therein; and
(b) an inner member coaxial with and slidably mounted in said outer member, said inner member including
   (i) actuating means for actuating said locking means, and
   (ii) a first outwardly facing cylindrical surface having second recess means therein;

said fueling machine comprising a casing, means for aligning said casing with said selected channel and ram means mounted in said casing for inserting a said fuel aggregate into and extracting it from said selected channel, said ram means including (c) an outer tube having
   (i) first engaging means for engaging said first recess means and
   (ii) a second inwardly facing cylindrical surface;
(d) means for displacing said outer tube relatively to said casing in coaxial relationship with the longitudinal axis of said fuel aggregate;
(e) an inner tube coaxially mounted within said outer tube and having
   (i) second engaging means for engaging said second recess means, said second engaging means being actuated by said second inwardly facing surface,
   (ii) a second outwardly facing cylindrical surface for actuating said first engaging means, and
   (iii) means for operating said actuating means; and
(f) means for displacing said inner tube axially relatively to said outer tube for actuating said first and second engaging means for coupling said ram means to said end plug portion and for subsequently operating said actuating means for unlocking said end plug portion from said selected channel.

In the new concept according to this invention only two operative members slidably engaging each other are required to perform all of the functions for unlocking the end plug portion, releasing the seal and displacing the fuel aggregate from the channel.

In a preferred embodiment of the present invention, the two tubes of the ram mechanism are independently moved by two ball drive units.

Further features of the present invention will appear from the following specific description which is provided by way of example only. In the accompanying drawings.

OVERALL ARRANGEMENT OF FUELLING MACHINE

Figure 1:
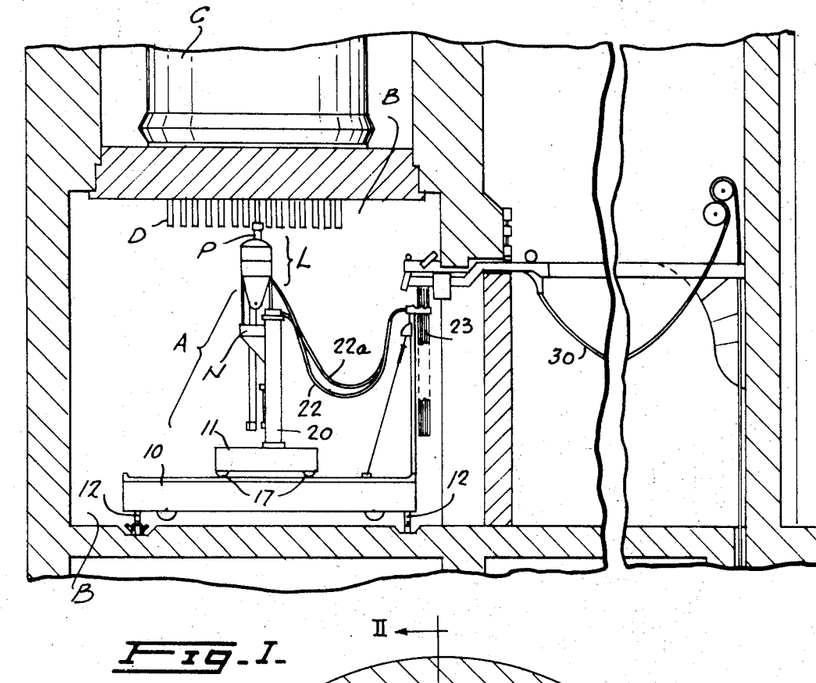
FIG. 1 is a cutaway elevation view of a fueling machine associated wtih a nuclear reactor.

FIG. 1 illustrates the overall arrangement of a fuelling machine A located in a vault B beneath a nuclear reactor vessel C that has a plurality of fuel channels D that are required to be kept supplied with strings of nuclear fuel. The fuelling machine A comprises a main carriage 10 along which a trolley 11 can travel. The carriage 10 is provided with four wheels 12 for travel along the fuelling vault B in a first direction, and the trolley 11 has four wheels 17 for travel along the main carriage 10 in a second direction perpendicular to the first direction. Mounted on the trolley 11 are two upright columns 20 along which a support member N is slidably in a vertical direction. A fuelling machine head L having a snout subassembly P is connected to the support member N so as to be rotatable about a horizontal axis.

To couple the snout subassembly P to any one of the fuel channels D, the carriage 10 and the trolley 11 are moved to the appropriate location and then the machine head L is shifted upwardly to a position similar to that shown in FIG. 1.

For the required fuel supply, tubes (not shown) leading from the outside into the fuelling vault B may be disposed either in a vertical or a horizontal direction. In the latter case, coupling of the snout subassembly P to such supply tubes is performed by rotating the machine head L through 90° about its horizontal axis, shifting the head to the appropriate height and moving the trolley 11 and the carriage 10 to the appropriate location.

To carry out the required movements, the wheels 12 and 17, the support member N, and the machine head L are driven by hydraulic motors (not shown) in a conventional manner. Cables 22, 22a, 23, 30 for supplying the fuelling machine with hydraulic pressure and control signals connect the support member N to a pressure aggregate and control circuits which may be installed outsidt the fuelling vault B.

GENERAL STRUCTURE OF THE FUELLING MACHINE HEAD

Figure 2:
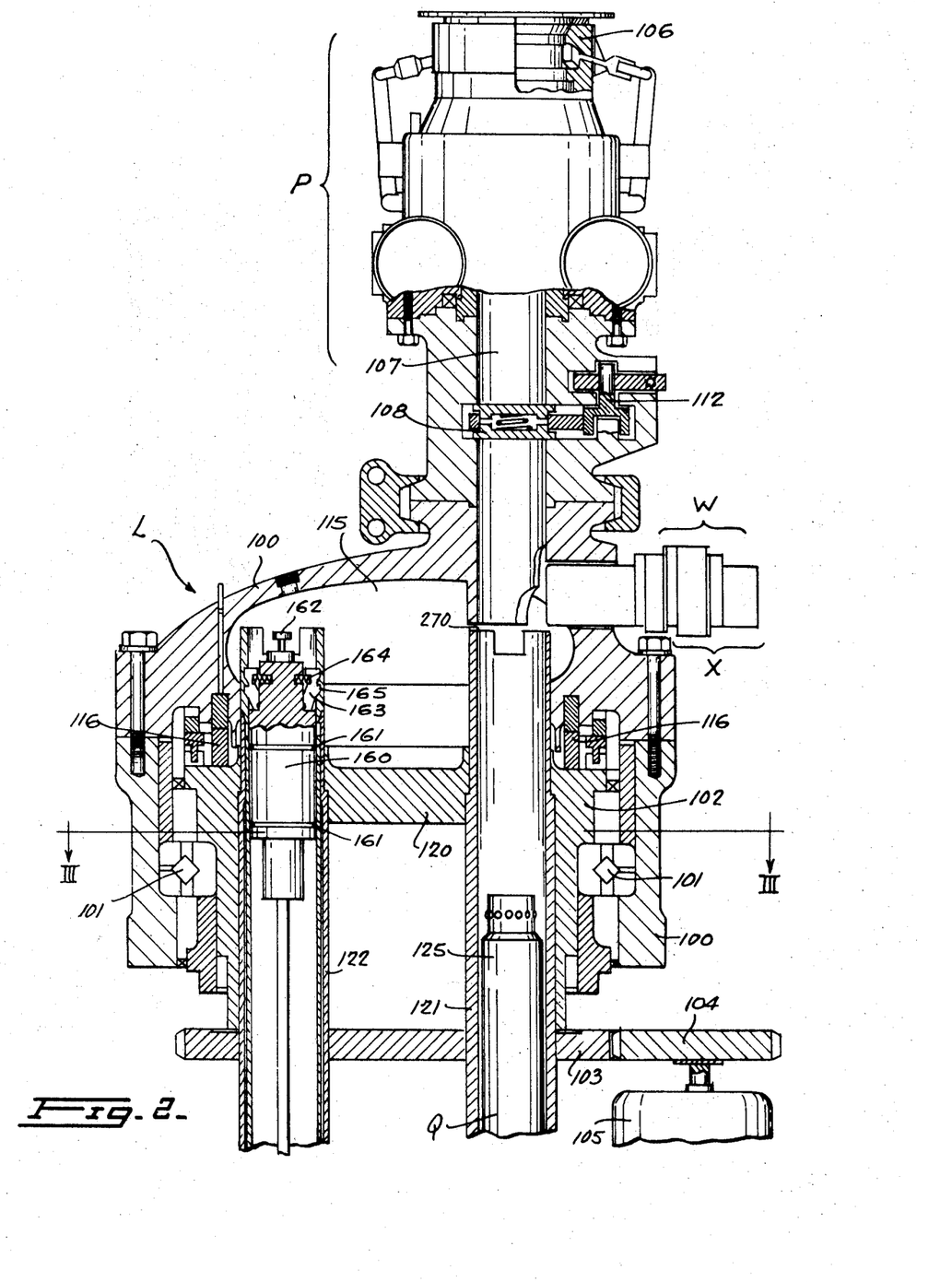
FIG. 2 is a section showing the head portion of the machine of FIG. 1, this section being taken on the line II—II in FIG. 3.
Figure 3:
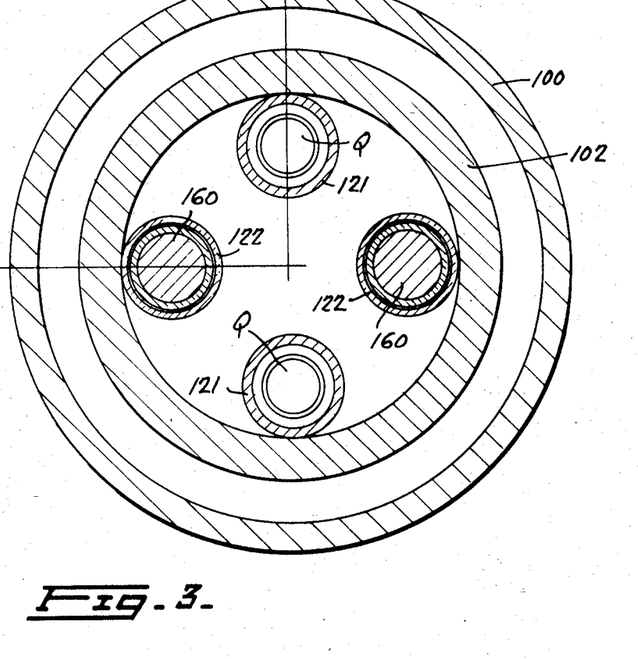
FIG. 3 is a transverse section on the line III—III in FIG. 2.

Details of the structure of the fuelling machine head L are shown in FIGS. 2 and 3. The head consists of a main housing 100 that is connected to the support member N (not shown in FIG. 2) and contains a bearing assembly 101 by means of which a turret 102 is rotatably mounted in the machine head. The turret 102 carries a large toothed wheel 103 meshing with a toothed wheel 104 on the shaft of a motor 105, this motor being employed for indexing the turret 102 between various positions relative to the main casing 100, in the manner and for the purposes described below.

Figure 7:
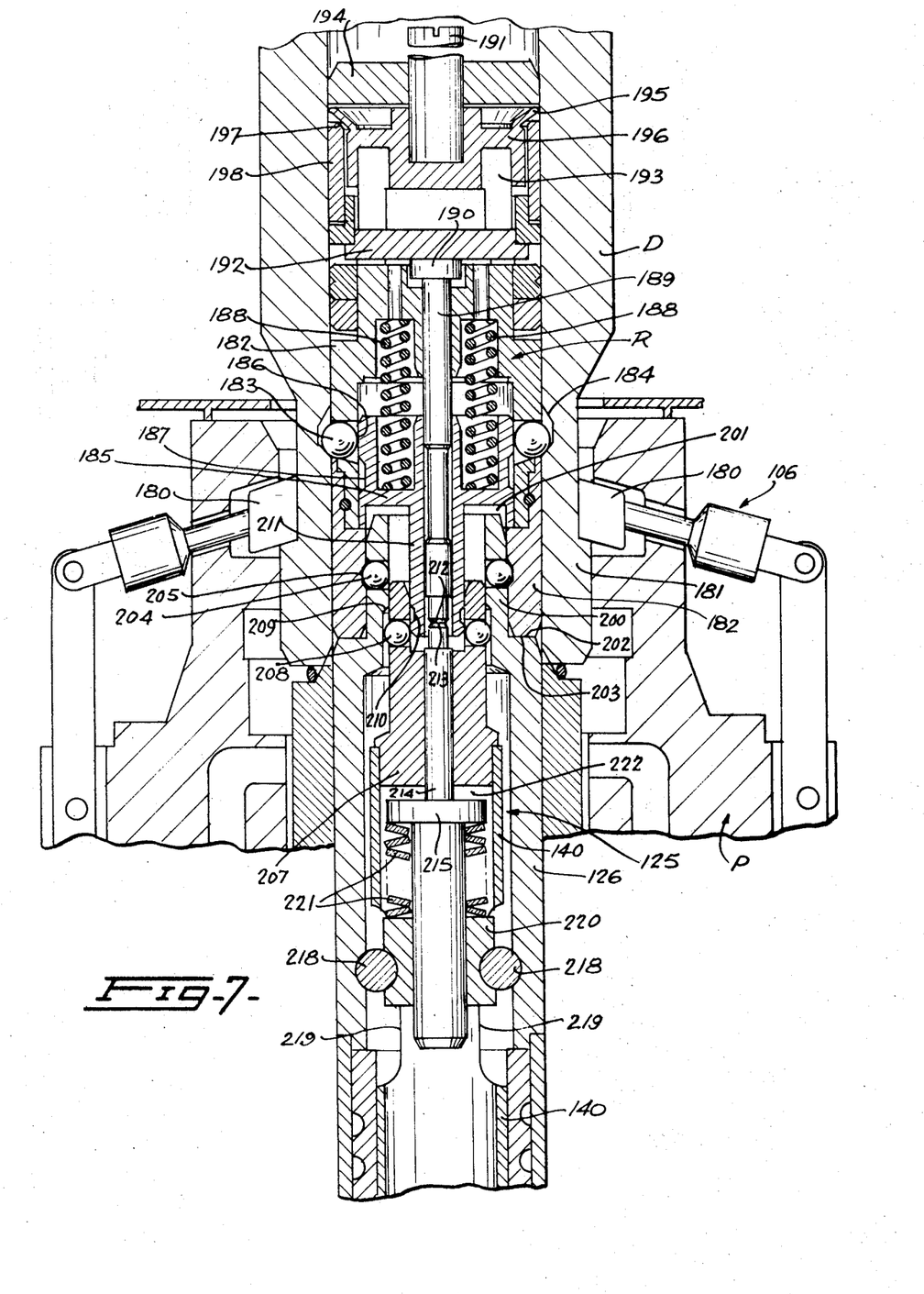
FIG. 7 is a fragmentary, enlarged, cross section of the snout portion of the machine head of FIG. 2, showing such snout portion locked onto a reactor fuel channel.

Rigidly connected to the housing 100 is the snout subassembly P including at its end a locking mechanism 106 for engaging the end of a reactor fuel channel D in the manner shown on the small scale in FIG. 1 and in more detail in the sectional view of FIG. 7. The snout subassembly P also serves to define a channel 107 extending from the locking mechanism 106 to the turret 102, a shut-off valve 108 being located in such channel 107. The valve 108 (shown in FIG. 2 in its closed position) can be opened by actuation of a mechanism 112.

During operation, a space 115 defined within the turret 102 will be in communication via the channel 107 with the interior of a reactor fuel channel D under high pressure. It is therefore necessary to provide the interior of the turret 102 with means for sealing such pressure against the exterior, this being accomplished by means of a controlled leakage hydrostatic seal 116, no further details of which need be provided since its structure is conventional.

The turret 102 comprises a head portion 120 from which four barrels 121 and 122 extend downwardly, such barrels constituting a pair of oppositely disposed ram barrels 121 and a pair of oppositely disposed fuel barrels 122 arranged intermediate the ram barrels (FIG. 3).

Each ram barrel 121 serves to house a ram mechanism Q which is described in more detail below. In each of the fuel barrels 122 there is slidably mounted a free piston 160 having seals 161 encircling its perimeter. At its forward end the piston 160 has a projecting pin 162 and at an intermediate location it carries pivoted mechanical stops 163 that are urged radially outwardly by springs 164 into engagement with cavities 165 in the barrel 122. The stops 163 and cavities 165 are shaped to prevent the piston 160 moving upwardly from the position shown in FIG. 2, while leaving it free to move downwardly. A valve 169 (see FIG. 14a) is provided at the rear end of the barrel 122 for controlling the hydraulic pressure admitted to the barrel 122 or allowed to escape therefrom.

RAM MECHANISM

Figure 4:
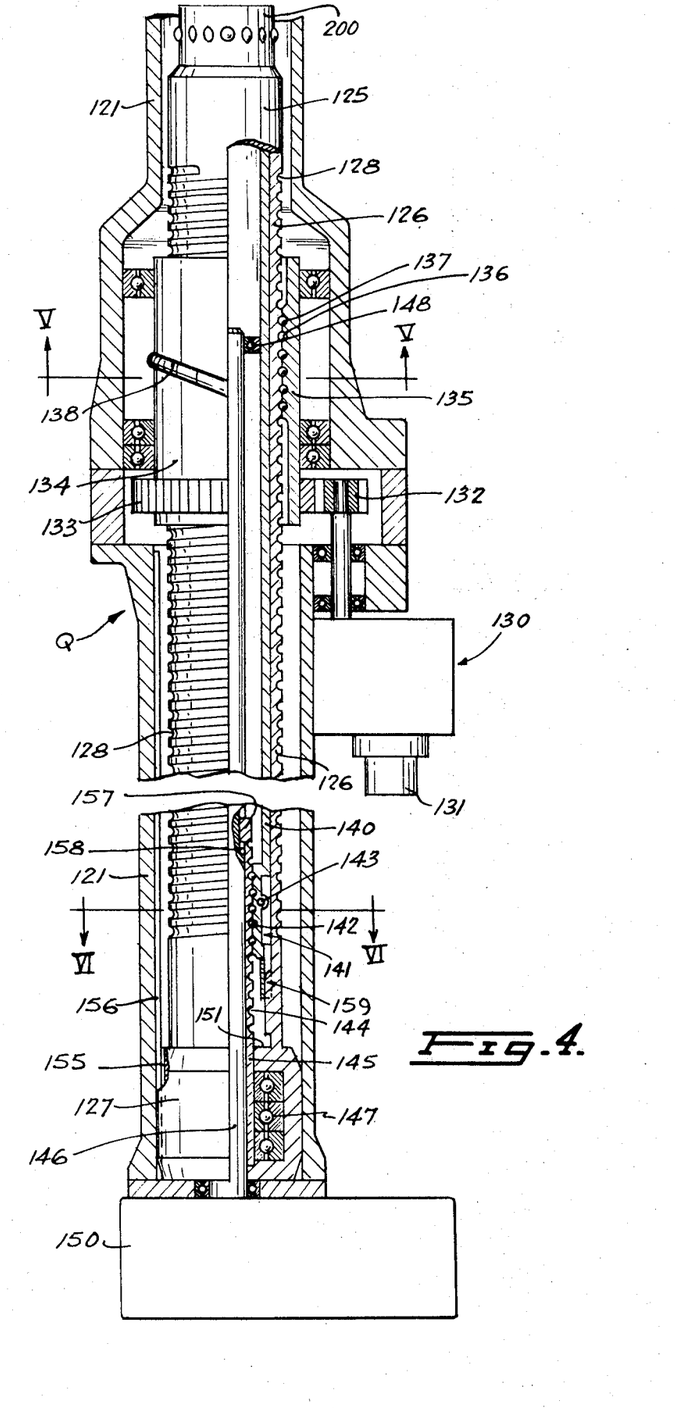
FIG. 4 is a longitudinal section showing one ram barrel of the fueling machine as connected to the machine head of FIG. 2, this view being taken on the lines IV—IV in FIGS. 5 and 6.
Figure 5:
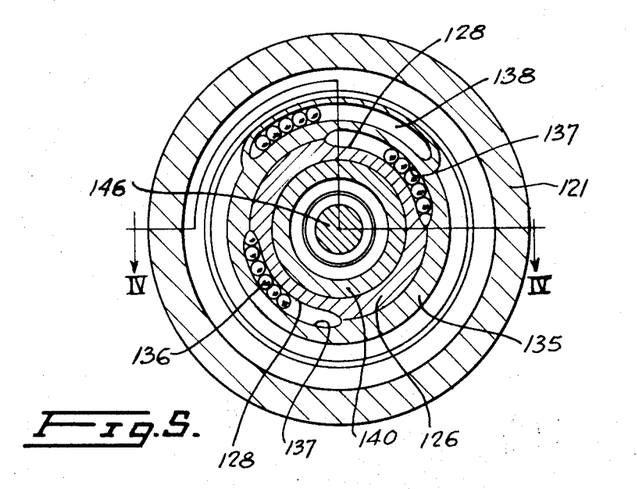
FIG. 5 is a cross section on the line V—V in FIG. 4.
Figure 6:
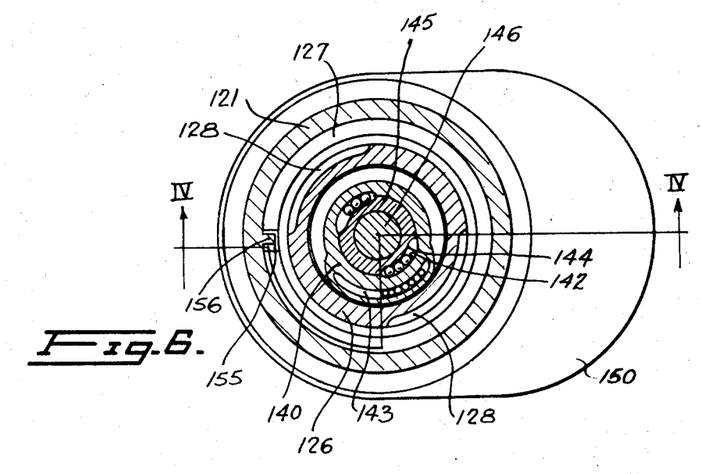
FIG. 6 is a cross section on the line VI—VI in FIG. 4.

As shown in FIGS. 4 to 6, the ram mechanism Q comprises a ram head 125 mounted at one end of an outer ram tube 126 that extends along the barrel 121 to terminate in an enlarged tail portion 127 that slides snugly in the barrel 121. FIG. 4 shows the ram mechanism Q in its fully retracted position, that is to say with the tail portion 127 at the extreme bottom end of the barrel 121.

The external surface of the outer ram tube 126 is formed with a helically extending groove 128 of semicircular cross section. A drive unit 130 comprises a motor 131 driving a gear 132 meshing with a gear 133 that is secured to a sleeve 134 surrounding the outer ram tube 126, a central portion 135 of the sleeve 134 containing a set of recirculating balls 136 that travel in the helical channel defined by cooperation of a helical groove 137 of semicircular cross section formed on the inner face of the central portion 135 of the sleeve 134 and the groove 128 of the outer ram tube 126. A return channel 138 is provided for the balls 136. This form of recirculating ball drive unit is conventional and therefore need not be further described in detail. Suffice to say that, when the sleeve 134 is rotated, the balls 136 are caused to migrate continuously around the channel defined between the grooves 128 and 137, which action has the effect of propelling the outer ram tube 126 longitudinally along the barrel 121 in a direction that depends on the direction of rotation of the motor 131. For this action properly to take place, it is necessary for the outer ram tube 126 to be restrained against rotation, this result being achieved by the provision of a channel 155 on its end portion 127 cooperating with a key 156 on the inner surface of the barrel 121 (see FIG. 6).

Slidably mounted within the outer ram tube 126 there is an inner latch tube 140 that is propelled along inside the ram tube by a second recirculating ball drive unit 141. For this purpose the inside surface of the latch tube 140 is formed with a helical groove 142 of semicircular cross-section and a ball recirculating channel 143. The groove 142 cooperates with a similar helical groove 144 of semicircular cross section formed on the outer surface of a driving member 145 that slides on an inner shaft 146. At one end of this system the member 145 is rotatably mounted on bearings 147 inside the end member 127, while at the other end the shaft 146 is rotatably mounted in bearings 148 located inside the latch tube 140.

To prevent relative rotation between the member 145 and the shaft 146, a key 157 at the inner front end of the member 145 engages an axially extending channel 158 on the shaft 146.

The latch tube 140 is splined to the outer ram tube 126 by means of a further key and channel arrangement 159 so as to be capable to sliding relative thereto but without rotation. In fact neither tube 126 nor 140 is free to rotate, so that, when the shaft 146 is rotated by a motor 150, causing the driving member 145 to rotate, the recirculating ball drive unit 141 causes the latch tube 140 to slide longitudinally within the outer ram tube 126. FIG. 4 shows the latch tube 140 in a somewhat advanced position, the extreme withdrawn position being defined by a stop surface 151. Due to the relative sliding movement permitted between the driving member 145 and the shaft 146, such driving member and the entire ball drive unit 141 is free to travel forwardly with the outer ram tube 126 without changing the relative positions of the tubes 126 and 140. In other words, the motor 131 serves to change the position of the outer ram tube 126 relative to the barrel 121, while the motor 150 changes the position of the inner latch tube 140 relative to the outer ram tube 126.

COOPERATION BETWEEN THE RAM MECHANISM AND A CLOSURE PLUG

FIG. 7 shows on a large scale the manner in which the locking mechanism 106 of the snout subassembly P engages the end of a reactor fuel channel D. The locking mechanism 106 includes a plurality of locking bars 180 that engage behind a lip 181 on the extreme end of the channel D. The structural details and manner of operation of a locking mechanism of this type are described in Canadian Hummel Pat. No. 738,840 issued July 12, 1966, and in the corresponding U.S. Pat. No. 3,169,909 issued Feb. 16, 1965, and will consequently not be repeated here.

Located in the end of each reactor fuel channel D in use there will be a closure plug R which consists basically of an outer cylindrical member 182 having arranged around its outer periphery a series of captive balls 183 that project into a groove 184 formed in the inner surface of the end of the channel D. This engagement locks the closure plug R against the longitudinally movement of the channel D that would otherwise result from the high pressure within the channel D. Slidably mounted within the outer plug member 182 is an inner plug member 185 that includes a projecting peripheral surface 186, that in the position shown in FIG. 7, serves to hold the balls 183 radially outwardly. The inner plug member 185 has a circumferential recess 187 situated below the projecting surface 186, so that, on upward sliding motion of the inner plug member 185 the balls 183 become free to move radially inwardly, as will be demonstrated subsequently in relation to FIG. 11. A set of strong springs 188 normally holds the inner plug member 185 in its lower position as shown.

Extending axially and slidably along inside the inner plug member 185 is a spindle 189 to the upper end of which there is secured a disc-like member 190 bearing against a bar 192 connected to a further upwardly extending outer sleeve 198.

Connected to the outer cylindrical member 182 are two segments 193 which engage a member 196. Integrally formed at the upper end of the member 196 is a peripheral conic lip 195 of very reduced thickness and hence of high flexibility, which lip forms a seal between the closure plug R and the interior of the fuel channel D. A connecting rod 191 is mounted in the member 196 and carries a projecting plate 194. When the outer sleeve 198 is moved upwardly relatively to the segments 193, an upper edge 197 engages the peripheral flexible lip 195 thereby compressing the lip radially and releasing the seal.

The outer ram tube 126 of the ram head 125, which tube is shown in FIG. 7 in a position sufficiently extended from that of FIG. 4 to locate it within the snout subassembly P, is formed at its upper end with a radially inwardly stepped tip portion 200 that is adapted to enter an end cavity 201 of the outer plug member 182 until an end surface 202 of such plug member 182 abuts an annular shoulder surface 203 formed on the outer ram tube 126. A set of captive balls 204 in the tip portion 200 of the outer ram tube 126 is arranged to engage a circular groove 205 formed on the inner surface of the end portion of the plug member 182 surrounding the cavity 201.

The inner latch tube 140 of the ram mechanism Q terminates in an inner tip portion 207 that is slidably mounted within the outer tip portion 200 and which carries a further set of captive balls 208 adapted for operation by an annular shoulder 209 on the inner surface of the outer tip portion 200. The balls 208 are adapted to enter an annular groove 210 formed on the outer surface of a tubular axial extension 211 projecting down into the cavity 201 from the inner plug member 185. A lower portion of the spindle 189 extends downwardly along the inner space defined within this tubular extension 211 to terminate at a surface 212. The surface 212 is located to engage, when the parts are brought together, an end surface 213 formed on a rod 214 that extends axially along the inner tip portion 207 associated with the latch tube 140, the rod 214 being secured to a disc 215 that is axially slidably mounted in a cavity 222 at the end of the latch tube 140. Secured to the outer ram tube 126 by two transverse rollpins 218 that project through elongated slots 219 in the latch tube 140 is a member 220. A spring 221 extends between the member 220 and the disc 215 to urge these parts apart.

CLOSURE PLUG REMOVAL PROCEDURE

FIGS. 8 to 12 illustrate on a smaller scale and by means of a sequence of illustrations the manner in which the snout subassembly P engages the end of a reactor fuel channel D to remove a closure plug R therefrom.

Figure 8:
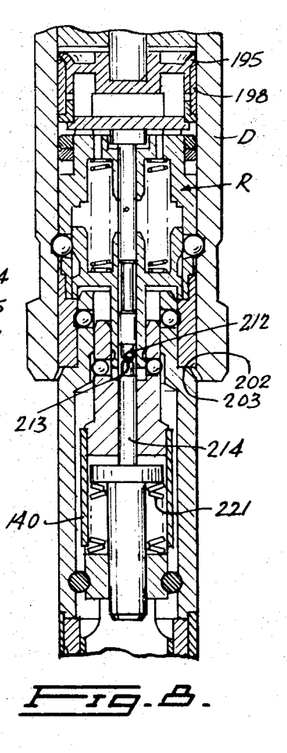
FIGS. 8 to 11 are a series of fragmentary, smaller scale, cross sections of this same area of the machine head, illustrating successive steps in removal of a closure plug by a mechanical ram.

The initial condition is shown in FIG. 8. The surfaces 202 and 203 have been brought together, by which time the abutting end surfaces 212 and 213 on the axial members will have engaged one another sufficiently to move the rod 214 slightly downwardly against the pressure of the spring 221. At this preliminary stage in the operation, the hydraulic pressure differential between the interior of the reactor fuel channel D and the interior of the turret space 115 is relatively high, so that the spring 221, although it is now acting upwardly on the outer sleeve 198, is unable to overcome such pressure differential to open the sealing lip 195.

Figures 9, 10, 11, 12:
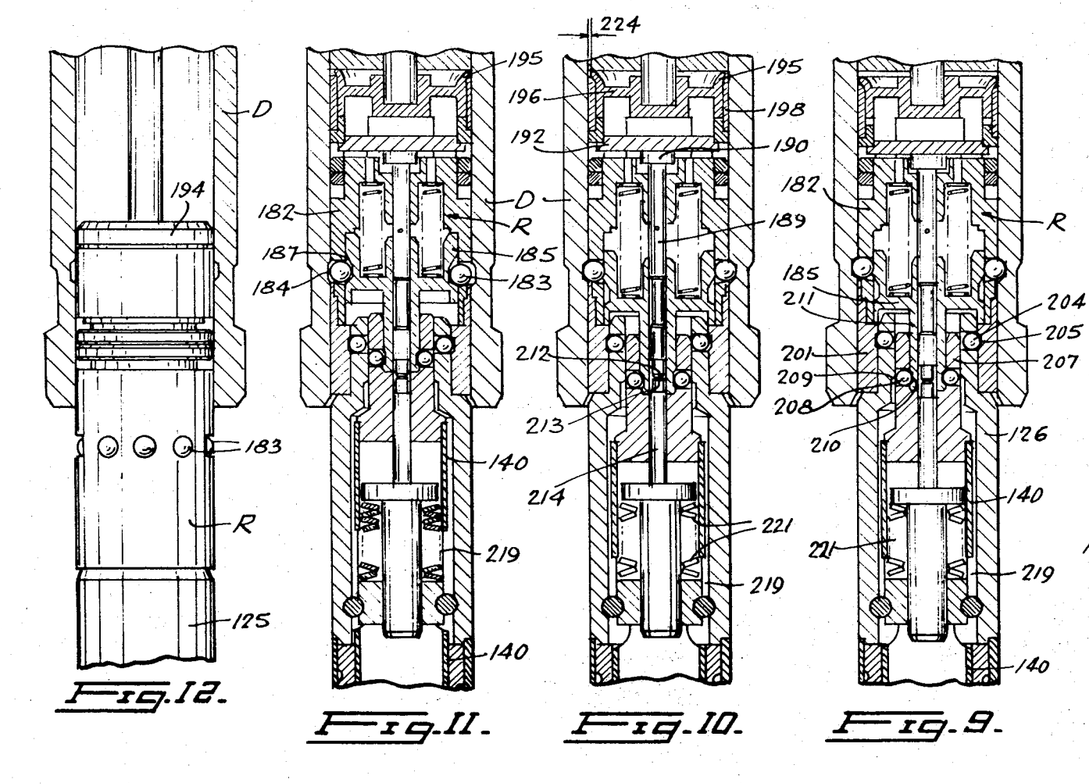
FIG 12 shows essentially the same parts as FIGS. 8 to 11, but in elevation, and at a still later stage in the operation.

The next stage of the operation is shown in FIG. 9 and consists of upward sliding motion of the latch tube 140 to cause its tip portion 207 to force outwardly the balls 204 into the groove 205 and hence lock the outer ram tube 126 to the outer plug member 182. At the same time, the shoulder 209 acts on the balls 208 to force them into firm engagement with the groove 210 thus locking the latch tube 140 itself to the downward extension 211 of the inner plug member 185. Thus, by this one motion, the outer and inner ram members (ram tube 126 and latched tube 140) are now firmly connected to the respective outer and inner members 182 and 185 of the closure plug R.

The water pressure in the fuelling machine, that is to say in the turret space 115, is now raised to equalize the pressure in the reactor fuel channel D, with the result that the spring 221 can now release the lip 195, such movement being transmitted through the rod 214; the contacting end surfaces 213 and 212; the spindle 189 and further members 190, 192, 198, to release the pressure between the sealing lip 195 and the inner surface of the fuel channel D, this condition being shown in FIG. 10 and being represented graphically by a space 224.

With the lip 195 thus released and the fluid pressure in the fuelling machine equalized with that in the fuel channel D, the next step in the operation is to advance the latch tube 140 further (FIG. 1). Since the latch tube 140 is connected to the inner plug member 185, its further longitudinal movement in the upward direction causes the inner plug member 185 to advance upwardly inside the outer plug member 182 until the groove 187 is brought into register with the balls 183, thus releasing the latter from engagement with their locking groove 184 on the inside wall of the fuel channel D. The closure plug R is thus released from the fuel channel D and is free to be withdrawn therefrom in the manner demonstrated in FIG. 12, that is by bodily downwardly movement of the ram head 125 by withdrawal of the ram mechanism Q.

ENTIRE FUEL AGGREGATE

Figures 13A, 13B:
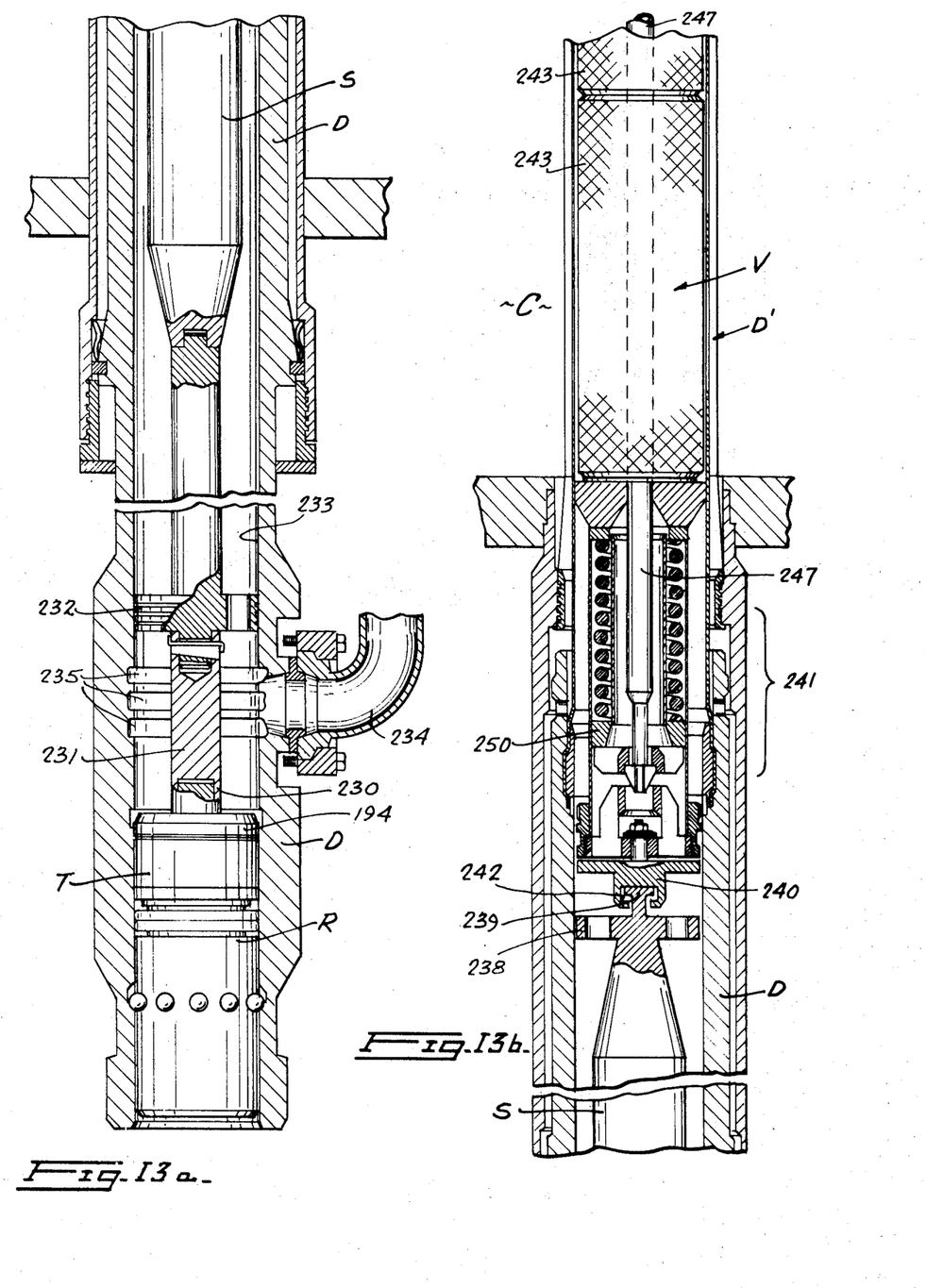
FIG. 13a shows the lower portion of a reactor fuel channel with an entire closure plug assembly therein.
FIG. 13b shows an adjacent portion of this reactor fuel channel with further parts of the plug assembly and a part of a fuel string.

An entire fuel aggregate consists of a fuel string and a plug assembly. The closure plug R that has so far been described forms only a part of the plug assembly, as can be seen from FIGS. 13a and 13b. FIG. 13a shows the plug R in normal operating position in the end of a fuel channel D and also shows the manner in which the lower end 230 of a rod 231 is fixed to the upper member 194 of the plug R. Rod 231 forms the lower extremity of a shield plug S which serves to reduce any neutron loss from the reactor and includes an orifice plate 232 the periphery of which is adapted to slide along the inner wall 233 of the reactor fuel channel D. A pipe 234 represents an entrance for coolant water which will flow into the channel D from one side and around flow distribution grooves 235 before travelling upwardly through the orifice plate 232 and along the channel D into the reactor vessel proper.

As shown in FIG. 13b, the upper end of the shield plug S terminates in a guide 238 and a T-pin 239 that engages a corresponding T-slot 242 in an end member 240 of a tensioning mechanism 241 mounted on the end of a fuel string V located in the active portion here designated D' of the reactor fuel channel D, namely the portion that extends through the reactor vessel C itself. The fuel string V consists of a series of separate fuel bundles 243, and the various bundles are joned together into a string by means of a tube 247 which extends along the entire fuel string V, having its lower end connected to an end member 250 in the tensioning mechanism 241.

FUEL UNLOADING AND RELOADING PROCEDURE

FIG. 14 shows in a series of small scale views designated a to h, the principal steps in a fuel unloading and reloading operation. FIG. 14a shows a reactor fuel channel D containing a closure plug R and shield plug S, together designated as a plug assembly T. The plug assembly T is connected to a tensioning mechanism 241 on the end of a fuel string V by means of the T-pin 239. It is assumed that the fuel string V consists of at least partly spent fuel and is to be removed from channel D and replaced by a fresh fuel string V' which is stored in a first one of the two fuel barrels 122 (here designated 122a) of the fuelling machine head L. One of the ram barrels 121 is aligned with the channel D and the ram mechanism Q has been advanced to release the closure plug R.

The ram mechanism Q is now fully withdrawn (FIG. 14b) which action has the effect of drawing the plug assembly T down into the barrel 121 in such a manner as to align its T-pin 239 with the extreme end 270 (FIG. 2) of the barrel 121. A mechanism X in the machine head L, which is described in detail in the copending U.S. patent application 721,293, filed Apr. 15, 1968, now ensures alignment of the open sides of the T-slot at the end of the tensioning mechanism 241 at the end of the fuel string V with the circumferential direction of movement of the turret 102. A further mechanism W which is described in detail in the copending U.S. patent application 721,410, filed Apr. 15, 1968, provides means for locking the fuel string temporarily in this position at this time. The circumferential alignment together with the fact that the fuel string cannot at this time move longitudinally permits the turret 102 to be indexed through 90°, which action is now carried out (FIG. 14c) with the effect that the T-pin 239 on the upper end of the plug assembly T is moved sideways out of its former engagement with the T-slot and is replaced by the T-pin 162 on the end of piston 160 in the other of the fuel barrels 122b, which second fuel barrel is empty at this time.

The next step (FIG. 14d) is to draw the fuel string V down into the fuel barrel 122b, and this effect is achieved by a gradual reduction of liquid pressure in the barrel 122b behind the piston 160 under the control of the valve 169.

Figure 14A:
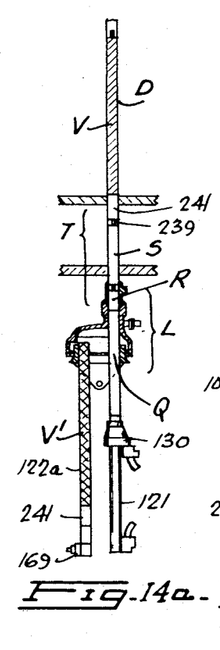
FIG. 14 consists of a series of small scale diagrammatic views a to h demonstrating a sequence of steps in a fuel unloading and reloading operation.
Figures 14B, 14C:
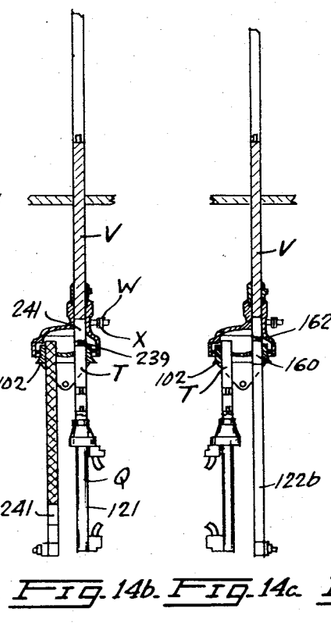
Figure 14D:
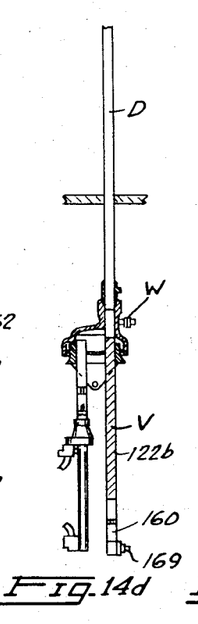
Figure 14E:
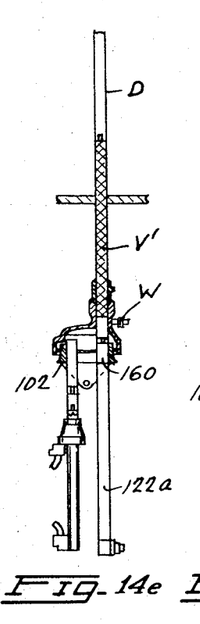

The turret 102 is now indexed around by 180° to bring the fuel barrel 122a containing the fresh fuel string V' into register with the channel D, whereupon sufficient pressure is applied behind the piston 160 in the barrel 122a to force it to move upwardly against the liquid pressure in the channel itself, thus moving the fuel string V' into the channel D (FIG. 14e). With the new string locked in this position, the turret 102 is now again indexed through 90° to return the ram barrel 121 to alignment with the channel D (FIG. 14f), and thus connecting the plug assembly T stored in the barrel 121 to the tensioning mechanism 241 of the new fuel string V'. The ram mechanism Q is then advanced to reinsert the plug assembly T with the fuel string V' attached thereto into the channel D (FIG. 14g).

Figures 14F, 14G, 14H:
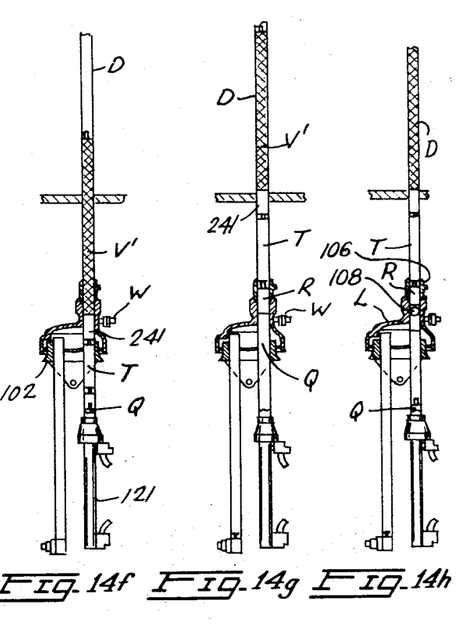

Finally, the closure plug R is replaced in the end of the channel D and the ram mechanism is retracted (FIG. 14h).

The liquid pressure inside the machine head L is then reduced, the shut-off valve 108 closed and locking mechanism 106 of the machine head L released in order to disengage the fuelling machine head from the particular channel D that has been refuelled.

It will have been noticed that during the refuelling operation only one of the ram barrels 121 was used and indeed only one is strictly necessary. In practice, the second ram barrel houses a standby ram mechanism and a spare closure plug assembly which is inserted into the fuel channel in the event that the original plug is leaking or defective or that the complex ram mechanism does not function properly.

We claim:

1. A nuclear reactor installation, comprising a reactor and a fuelling machine for loading and unloading elongated fuel aggregates into and from channels of said reactor, said fuel aggregates comprising a fuel portion connected to an end plug portion, said end plug portion of a said fuel aggregate comprising
    (a) an outer cylindrical member including
        (i) locking means for locking said end plug portion in a selected said channel, and
        (ii) a first inwardly facing cylindrical surface having first recess means therein; and
    (b) an inner member coaxial with and slidably mounted in said outer member, said inner member including
        (i) actuating means for actuating said locking means, and
        (ii) a first outwardly facing cylindrical surface having second recess means therein;
said fuelling machine comprising a casing, means for aligning said casing with said selected channel and ram means mounted in said casing for inserting a said fuel aggregate into and extracting it from said selected channel, said ram means including
    (c) an outer tube having
        (i) first engaging means for engaging said first recess means, and
        (ii) a second inwardly facing cylindrical surface;
    (d) means for displacing said outer tube relatively to said casing in coaxial relationship with the longitudinal axis of said fuel aggregate;
    (e) an inner tube coaxially mounted within said outer tube and having
        (i) second engaging means for engaging said second recess means, said second engaging means being actuated by said second inwardly facing surface,
        (ii) a second outwardly facing cylindrical surface for actuating said first engaging means, and (iii) means for operating said actuating means; and (f) means for displacing said inner tube axially relatively to said outer tube for actuating said first and second engaging means for coupling said ram means to said end plug portion and for subsequently operating said actuating means for unlocking said end plug portion from said selected channel.

2. A nuclear reactor installation, comprising a reactor and a fuelling machine for loading and unloading elongated fuel aggregates into and from channels of said reactor, said fuel aggregates comprising a fuel portion connected to an end plug portion, said end plug portion of a said fuel aggregate comprising
(a) an outer cylindrical member including
(i) locking means for locking said end plug portion in a selected said channel,
(ii) a first inwardly facing cylindrical surface having first recess means therein, and
(iii) means for sealing said selected channel;
(b) an inner member coaxial with and slidably mounted in said outer member, said inner member including
(i) actuating means for actuating said locking means, and
(ii) a first outwardly facing cylindrical surface having second recess means therein; and
(c) releasing means coaxial with and slidably mounted in said inner and outer members for releasing said sealing means;
said fuelling machine comprising a casing, means for aligning said casing with said selected channel and ram means mounted in said casing for inserting a said fuel aggregate into and extracting it from said selected channel, said ram means including
(d) an outer tube having
(i) first engaging means for engaging said first recess means,
(ii) a second inwardly facing cylindrical surface; and
(iii) means for actuating said releasing means;
(e) means for displacing said outer tube relatively to said casing in coaxial relationship with the longitudinal axis of said fuel aggregate;
(f) an inner tube coaxially mounted with said outer tube and having
(i) second engaging means for engaging said second recess means, said second engaging means being actuated by said second inwardly facing surface,
(ii) a second outwardly facing cylindrical surface for actuating said first engaging means, and
(iii) means for operating said actuating means; and
(g) means for displacing said inner tube axially relatively to said outer tube for actuating said first and second engaging means for coupling said ram means to said end plug portion, for subsequently operating said releasing means and for operating said actuation means for unlocking said end plug portion from said selected channel.

3. An installation as in claim 2, wherein said means for actuating said releasing means includes a fixing member rigidly connected to said outer tube, a rod slidably mounted in said inner tube and a pressure spring disposed between said fixing member and said rod.

4. An installation as in claim 1, wherein said selected channel includes an inner circumferential groove, said locking means includes a circumferentially disposed set of holes in said outer member, each hole containing a captive ball, and said actuating means includes a surface positioned for forcing said balls to project into said groove.

5. An installation as in claim 2, wherein said sealing means comprises a cone-shaped flexible portion and said releasing means comprises a sleeve for radially compressing said flexible portion.

6. An installation as in claim 1, wherein each of said first and second engaging means comprises a set of captive balls retained in holes disposed in the respective tube, said balls projecting into the respective first and second recesses upon actuation by the respective said outwardly and inwardly facing surfaces.

7. An installation as in claim 1, wherein said means (d) comprises
(i) a first helical groove of substantially semicircular cross section on the outer surface of said outer tube,
(ii) a cylindrical sleeve coaxial with said outer tube, having a second helical groove of substantially semicircular cross section on its inner surface,
(iii) a set of balls disposed between said first and second grooves,
(iv) means for rotating said sleeve relatively to said casing, and
(v) means slidably engaging said outer tube for securing it against rotation relative to said casing.

8. An installation as in claim 1, wherein said means (f) comprises
(i) a first helical groove of substantially semicircular cross section on the inner surface of said inner tube,
(ii) a cylindrical sleeve coaxial with said inner tube and mounted for axial displacement with said outer tube, said sleeve having a second helical groove of substantially semicircular cross section on its outer surface,
(iii) a shaft coaxial with and slidably mounted on said cylindrical sleeve,
(iv) a set of balls disposed between said first and second grooves,
(v) means for rotating said shaft relatively to said casing,
(vi) means slidably engaging said inner and outer tubes for preventing relative rotation therebetween, and
(vii) means for securing rotation of said sleeve relative to said shaft.

References Cited
UNITED STATES PATENTS

| | | | |
|---|---|---|---|
| 3,157,579 | 11/1964 | Hummel | 176—30 |
| 3,169,909 | 2/1965 | Hummel | 176—30 |

CARL D. QUARFORTH, Primary Examiner

H. E. BEHREND, Assistant Examiner

U.S. Cl. X.R.

214—18